US009425634B2

(12) United States Patent
Imamura et al.

(10) Patent No.: US 9,425,634 B2
(45) Date of Patent: Aug. 23, 2016

(54) CHARGING APPARATUS FOR SECONDARY BATTERY

(71) Applicants: TAMURA CORPORATION, Tokyo (JP); MAKITA CORPORATION, Anjo-shi, Aichi (JP)

(72) Inventors: Koji Imamura, Toyonaka (JP); Takeshi Yamamoto, Sakai (JP); Yasuhiro Tabuchi, Nagoya (JP); Makihiro Kobayashi, Toyoake (JP)

(73) Assignees: TAMURA CORPORATION, Tokyo (JP); MAKITA CORPORATION, Anjo-Shi (JP)

(*) Notice: Subject to any disclaimer, the term of this patent is extended or adjusted under 35 U.S.C. 154(b) by 254 days.

(21) Appl. No.: 14/148,089

(22) Filed: Jan. 6, 2014

(65) Prior Publication Data
US 2014/0197780 A1 Jul. 17, 2014

(30) Foreign Application Priority Data

Jan. 17, 2013 (JP) ................................ 2013-006727
Jan. 17, 2013 (JP) ................................ 2013-006729

(51) Int. Cl.
H02J 7/00 (2006.01)
H02J 7/02 (2016.01)

(52) U.S. Cl.
CPC ............. *H02J 7/0052* (2013.01); *H02J 7/0047* (2013.01); *H02J 7/027* (2013.01); *H02J 2007/0049* (2013.01)

(58) Field of Classification Search
USPC ....................................................... 320/108
See application file for complete search history.

(56) References Cited

U.S. PATENT DOCUMENTS

| 5,747,968 A | 5/1998 | Merritt et al. |
| 2008/0291709 A1 | 11/2008 | Kawasaki |
| 2009/0224723 A1* | 9/2009 | Tanabe ................... H02J 7/025 320/108 |
| 2010/0013432 A1* | 1/2010 | Toya ..................... H02J 7/0027 320/108 |
| 2010/0207771 A1* | 8/2010 | Trigiani .............. B60L 11/1816 320/108 |

FOREIGN PATENT DOCUMENTS

| JP | H06-14184 A | 1/1994 |
| JP | H06-141484 A | 5/1994 |
| JP | A-2003-143854 | 5/2003 |

(Continued)

OTHER PUBLICATIONS

Extended European Search Report issued in European Patent Application No. 14151294.7 dated May 9, 2014.

(Continued)

*Primary Examiner* — Robert Grant
(74) *Attorney, Agent, or Firm* — Oliff PLC

(57) ABSTRACT

A charging apparatus for a secondary battery comprises: a power supply circuit connected to a primary winding 11a of a transformer T1; a main winding 11b and a sub winding 11c connected to a secondary side of the transformer T1; a charging circuit 110 connected to the main winding 11b, the charging circuit 110 supplying power to a battery pack 130 to be charged; and a control circuit 120 connected to the sub winding 11c, the control circuit 120 controlling the charging circuit 110, wherein the charging circuit 110 comprises a LED 140 indicating a standby state or a charge completion state, the LED 140 being lighted at light-load time of the charging circuit 110 based on a command of the control circuit 120.

3 Claims, 4 Drawing Sheets

(56) References Cited

FOREIGN PATENT DOCUMENTS

| | | |
|---|---|---|
| JP | A-2004-357420 | 12/2004 |
| JP | B2-3661472 | 6/2005 |
| JP | A-2006-20437 | 1/2006 |
| JP | A-2009-177963 | 8/2009 |

OTHER PUBLICATIONS

May 10, 2016 Office Action issued in Japanese Application No. 2013-006727.

May 10, 2016 Office Action issued in Japanese Application No. 2013-006729.

* cited by examiner

CHARGING APPARATUS FOR SECONDARY BATTERY

TECHNICAL FIELD

The present invention relates to a charging apparatus for a secondary battery, in particular, a charging apparatus having a main winding connected to a charging circuit and a sub winding connected to a control circuit as a secondary winding of a transformer to step down a power supply voltage.

BACKGROUND ART

Conventionally, as a charging apparatus for a secondary battery, a switching supply that combines a switching element for generating alternating current and a transformer have been used in general, as described, in Japanese Unexamined Patent Application Publication No. 2004-357420 (Patent Literature 1), Japanese Unexamined Patent Application Publication No. 2006-20437 (Patent Literature 2) and Japanese Patent No. 3661472 (Patent Literature 3), for example. In the switching supply, a utility power supply is connected to a primary side of the transformer, and a charging circuit and a control circuit of the secondary battery are connected to a secondary side of the transformer, and as well a switching element such as a transistor, a FET and the like are disposed to the primary side of the transformer. A power required in the charging circuit is detected by the control circuit of the secondary side, and by feeding back this to the primary side, the switching element is turned on and off.

In this kind of charging circuit in the related art, a bleeder resistor is provided for ensuring power for driving the control circuit, and for stabilizing the operation of the switching element, in light-load time such as standby time where a battery pack is not mounted to the charging apparatus, or charge completion time of the battery pack.

In other words, because a large voltage is required for the charging circuit, during charging operation of the battery pack, and a large electric power is supplied to the secondary side by successive switching operation of the switching element, a sufficient drive power for the control circuit can afford. However, because no large electric power is not required for the secondary side, in light-load time when the charging of the battery pack is not made, the oscillation frequency of the switching element is lowered and the electric power supplied to the secondary side is lowered. As a result, the drive power for the control circuit becomes insufficient, and so by inserting a bleeder resistor to the charging circuit, the electric power consumed by the bleeder resistor is supplied to the secondary side, and the electric power required for the control circuit is to be supplied.

Recently, for the purpose of reducing $CO_2$ emissions, the energy savings on appliances are under progress. Standardization of energy consumption has progressed in each country, power efficiency and standby power also had to be corresponding to a reference value or less. Also in the charging apparatus for the battery, total energy regulation under standby, under charging and after charging is being standardized.

However, in the related art as described above, the electric power consumption of the bleeder resistor during standby or at charge completion time disturbed the reduction of the energy consumption. That is, this type of charging apparatus controls the switching element responding to the load of the charging circuit, but in the light load, such as when the battery pack is not inserted in such a circuit, the switching element cuts down on the oscillatory frequency or makes an intermittent oscillation called the burst mode to reduce a loss at light-load time.

Meanwhile, even if the charging circuit is in light-load time, it is not preferable to cut down on the oscillatory frequency of the switching element over a constant limit or to makes the intermittent oscillation, and to reduce the electric power to be supplied to the secondary side, because it is necessary to keep a voltage larger than a constant voltage value necessary for the operation of the control circuit in the control circuit connected to the sub winding. Therefore, in the related art, by providing the charging circuit with the bleeder resistor, so that a load corresponding to the bleeder resistance remains in the charging circuit even at light-load time, it has been intended to stabilize the switching element and to secure the electric power for driving the control circuit. However, because the presence of such a bleeder resistor has nothing to do with the charging performance and the convenience of the user, and only consumes electric power, it is not preferable from the standpoint of the effective use of electric power.

In particular, it is general to provide the control circuit with a series regulator so as to obtain a constant voltage necessary for the control circuit. If the oscillation of the primary side controller is in the burst mode for reducing the electric power, the charge to a capacitor constituting rectifying circuit is performed, by the burst period in response to the load on the charging side, the rectifying unit of the control circuit side. However, by consuming the electric power in the control circuit side during the burst period, the charge stored in the control circuit side is consumed, and so the input voltage might be below the minimum input voltage to ensure the stable operation of the series regulator, and sometimes the control circuit cannot operate stably.

CITATION LIST

Patent Literature

Patent Literature 1: Japanese Unexamined Patent Application Publication No. 2004-357420
Patent Literature 2: Japanese Unexamined Patent Application Publication No. 2006-020437
Patent Literature 3: Japanese Patent No. 3661472

SUMMARY OF INVENTION

Technical Problem

The present invention has been made to solve the problems of the related art as described above. An object of the present invention is to provide a charging: apparatus of a secondary battery which eliminates necessity of a bleeder resistor and makes it possible to reduce power consumption at a light load.

Solution to Problem

A charging apparatus for a secondary battery according to an aspect of the present invention, comprises: a power supply circuit connected to a primary winding of a transformer; a main winding and a sub winding connected to a secondary side of the transformer; a charging circuit connected to the main winding, the charging circuit supplying power to a battery pack to be charged; and a control circuit connected to the sub winding, the control circuit controlling the charging circuit, wherein the charging circuit comprises a LED indicating a standby state or a charge completion state, the LED being lighted at light-load time of the charging circuit based on a command of the control circuit.

In the aspect, the LED may be connected to charging circuit via a constant voltage circuit connected in series with the LED.

In the aspect, the charging circuit may comprise a resistor connected to a connection point of the LED and the constant voltage circuit at one end and connected to the control circuit at the other end.

In the aspect, the control circuit may allow the LED to blink responding to a charge state of the battery pack at light-load time of the charging circuit, control current not to flow to the resistor when the LED is lighted up, and control current to flow to the resistor when the LED is lighted out.

Advantageous Effects of Invention

According to the present invention, provide is a charging apparatus of a secondary battery which eliminates necessity of a bleeder resistor and makes it possible to reduce power consumption at light-load time.

DESCRIPTION OF EMBODIMENTS

1. First Embodiment 1-1. Configuration of First Embodiment

Figure 1:
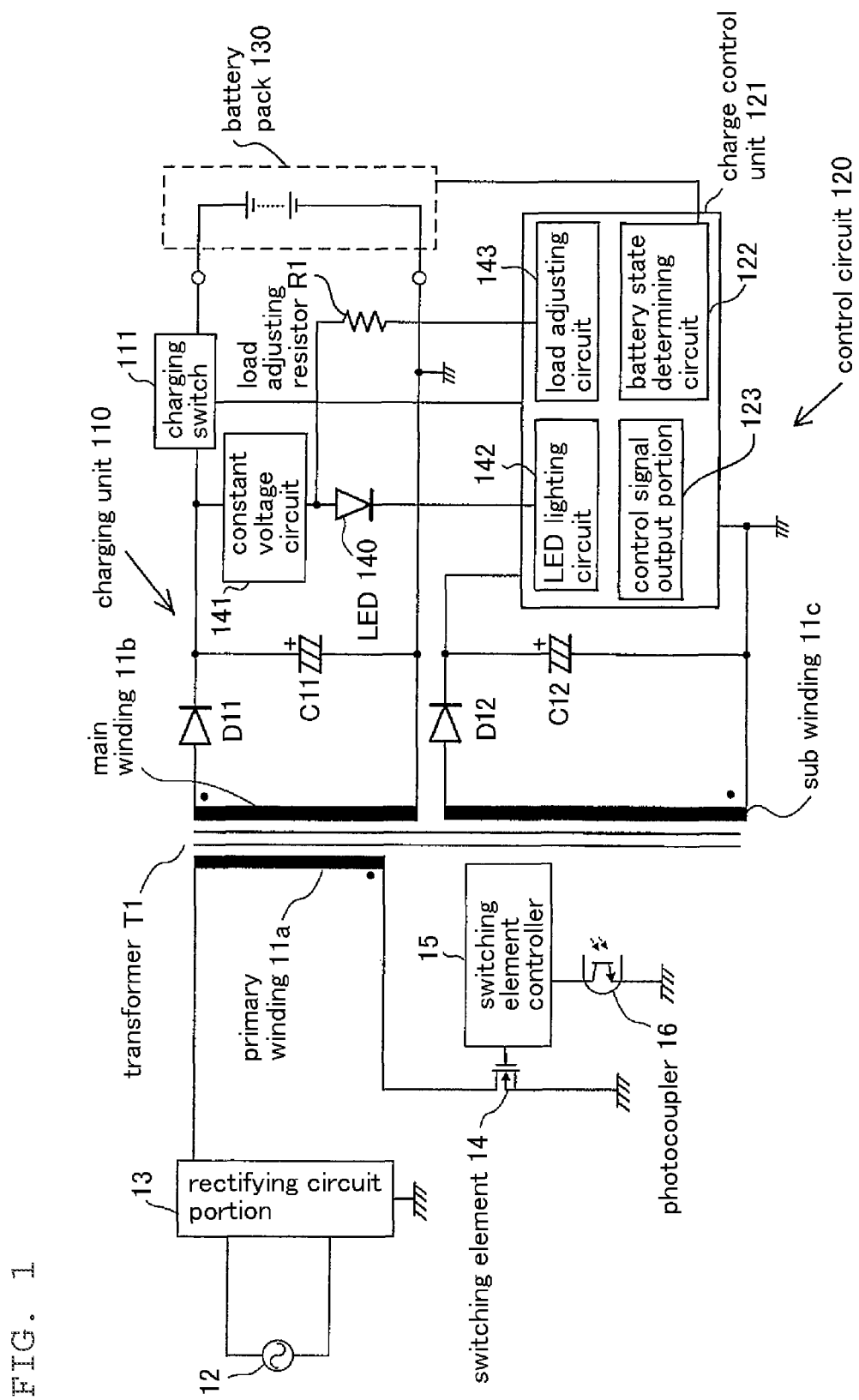
FIG. 1 is a circuit diagram showing a first embodiment according to the present invention.

Hereinafter, a first embodiment of the present invention shall be described in detail according to FIG. 1. In the present embodiment, an AC power source 12 is connected to one end of a primary winding 11a of a transformer T1 through a rectifier circuit 13, and a switching element 14 is connected to the other end of the primary winding 11a. The switching element 14 is provided with a primary side switching element controller 15 for controlling the on-off. A receiving portion of a photocoupler 16 is connected to the switching element controller 15 of the primary side, and the receiving portion receives a control signal of the switching element 14 transmitted from the control circuit 120. A transmitting portion of the photocoupler 16 is disposed to the control circuit 120 connected to a secondary side of the transformer T.

The on-off of the switching element 14 is controlled by the primary side switching element controller 15 responding to a control signal from the control circuit 120, and the switching element 14 outputs a charge output to a secondary side. The secondary side of transformer T1 is provided with a main windings 11b and a sub winding 11c. A charging circuit 110 is connected to the main winding 11b, and the control circuit 120 is connected to the sub winding 11c.

A battery pack 130 to be charged is connected to the charging circuit, and a voltage required to charge the battery pack 130 is supplied from the main winding 11b. The battery pack 130 is provided with an internal circuit (not shown) for detecting charge and discharge state of the battery pack 130 and a temperature of the battery. The charging circuit 110 is provided with a diode D11 and capacitor C11 for rectification connected to the main winding 11b, and with a charging switch 111 to start or stop charging of the battery pack 130.

The control circuit 120 controls the voltage and the current of the charging circuit 110, in response to the status of the charging and discharging of the battery pack 130, and the power for driving the control circuit 120 is supplied from the sub winding 11c. The control circuit 120 is provided with a diode D12 and capacitor C12 for rectification connected to the sub winding 11c, and with a charge control unit 121 connected to the charging switch 111 for charging the circuit 110.

The charge control unit 121 is provided with a battery state determining circuit 122 for determining the status of the battery pack 130, and turn on and off the charging switch 111 in response to the temperature of the battery and the charge and discharge state of the battery pack 130 detected by the battery state determining circuit 122. An output section 123 is provided for outputting a signal which controls the on-off of the switching element 14 of the charge control unit 121. The charge control unit 121 constantly monitors the voltage of the charging circuit 110, and outputs, a control signal for turning on and off the switching element 14 responding to the detected voltage from the signal output unit 123, to the photocoupler 6 provided on the primary side of transformer T1.

The LED for status display 140 is provided to connect the charging circuit 110 and the control circuit 120. One end of the LED for status display 140 is connected to the main winding 11b of the charging circuit 110, through a constant voltage circuit 141 which is connected in series to the LED 140. The other end of the LED 140 is connected to the charge control unit 121 of the control circuit 120 which is connected to the sub winding 11c. The LED for status display 140 is intended to light or blink during light load of the charging circuit 110.

A load adjusting resistor R1 is connected to the main winding 11b of the charging circuit 110 through a constant voltage circuit 141 at one end and to the charge control unit 121 of the control circuit 120 which is connected to the sub winding 11e at the other end in the same way as the case for the LED for status display 140. The load adjusting resistor R1 corresponds to the bleeder resistor in the related art.

The charge control unit 121 is provided with a LED lighting circuit 142, and a load adjustment circuit 143 for driving the load adjusting resistor R1 in place of the LED lighting circuit 142, in order to control the lighting or blinking of the LED for status display 140. The LED lighting circuit 142 controls continuous lighting or intermittent lighting, that is blinking, of the LED 140, responding to detection result of the battery state determining circuit 122 provided in the charge control unit 121, specifically, responding to the presence or absence of the battery pack 130, and the charge and discharge state of the battery pack 130.

Figure 2:
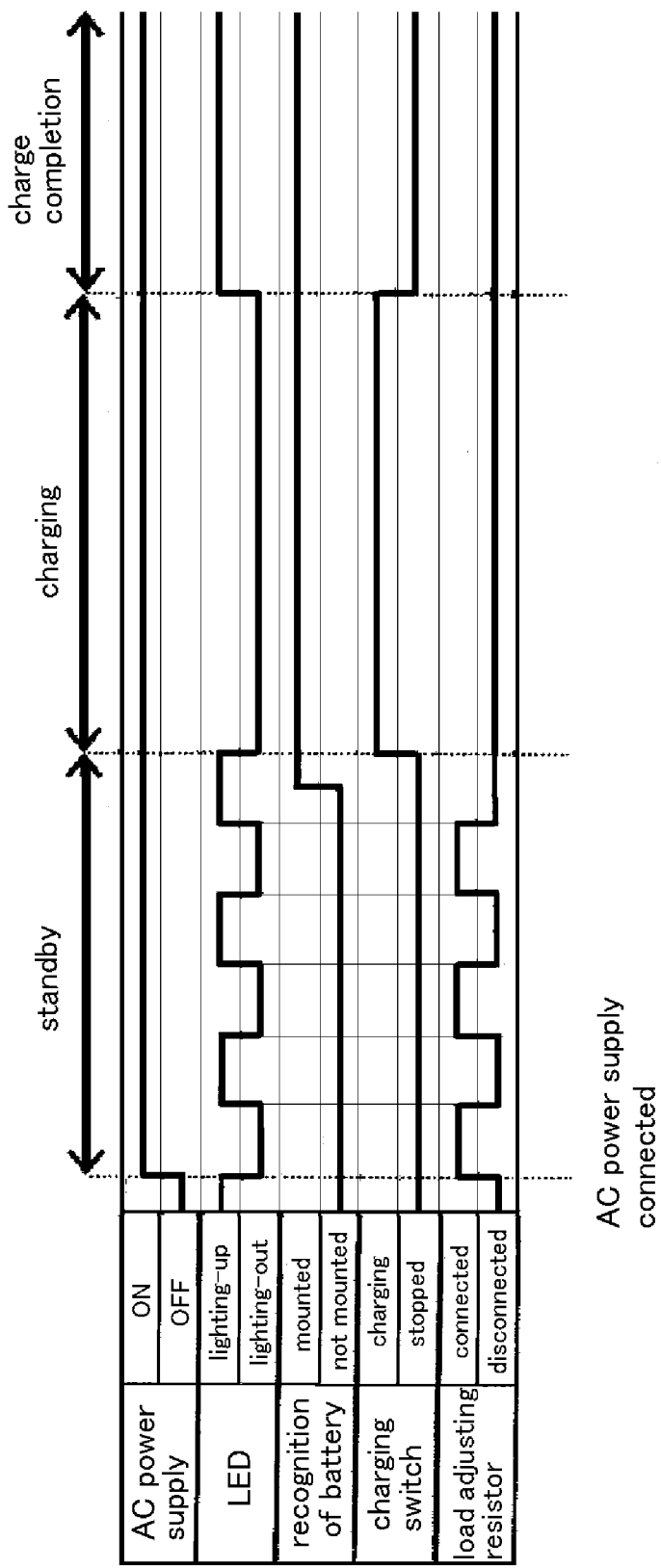
FIG. 2 is a sequence diagram showing a relationship of a adjustment resistor and lighting of a LED display in the first embodiment.

When the LED for status display 140 is turned off, the load adjusting resistor R1 consumes electric power of the charging circuit 110 is controlled by the load adjustment circuit 143, on behalf of the LED for status display 140. These operations are controlled by the load adjustment circuit 143 and the LED lighting circuit 142 provided in the control circuit 120. FIG. 2 shows an example of a specific sequence of the lighting of the LED for status display 140 and the load resistor R.

In the present embodiment, when the power is turned on in the standby state with no battery, the LED for status display 140 performs a blinking operation to repeat lighting and lighting out, in a sense of warning that the battery pack is not set in the charging apparatus, despite the power is turned on, in that case, the charging switch 111 is in a charge stop state, because the battery pack 130 is not set. During blinking operation of the LED for status display 140, no current flows through the load resistor R1 in a time when the LED for status display 140 is turned on, and current flows through the load resistor R1 in a time when the LED for status display 140 is turned off.

By detecting that the battery pack 130 is set to the charging apparatus, the charging switch 111 is turned on and charging starts, and at the same time the LED for status display 140 is turned off. During charging, no current flows through the load resistor R1 even in a time when the LED for status display 140 is turned off, because a predetermined load is applied to the charging circuit 110 and it is not necessary to input the load resistor R1.

When charging is complete, the charge switch 111 is turned off and the LED for status display 140 performs displaying charge completion by continuing the lighting. In this state, there is no need to supply current to the load resistor R1, because the current flows through the LED for status display 140.

1-2. Operation of First Embodiment

In the present embodiment, during charging the battery pack 130, it is necessary to supply much electric power required for charging to the charging circuit 110. Therefore, the control circuit 120 transmits a signal to the switching element controller 15 on the primary side through the photo-coupler 16 from the signal output unit 123, responding to the state of the battery pack 130 which is detected by the battery state determining circuit 122. The switching element controller 15 on the primary side performs on-off control of the switching element 14 by receiving a control signal from the control circuit 120 on the secondary side, and accordingly supplies necessary electric power to the primary side of the transformer T1.

On the secondary side of the transformer T, the main winding 11b steps down the voltage controlled by the switching element controller 15, and a voltage necessary for the charging circuit 110 is generated, and the voltage performs charging of the battery pack 130, after being rectified by the diode D11 and the capacitor C11 which are rectifying elements. In this case, because sufficient electric power for charging the battery pack 130 to the primary side of transformer T1, enough electric power sufficient to operate the control circuit 120 is also supplied in the sub winding 11c.

When the battery status determination unit 122 of the control circuit 120 detects charge completion of the battery pack 130, the charge control unit 121 stops the charging by turning off the charging switch 111. The switching element controller 15 commands a drop of the oscillatory frequency of the on-off control or a shift to a burst mode to the switching element 14 at light-load time. At the same time, the charge control unit 121 outputs a command for lighting or blinking of the LED for status display 140 to the LED lighting circuit 142, and the LED lighting circuit 142 turns on the LED for status display 140 intermittently or continuously responding to the command. As a result, charge completion of the battery pack 130, or standby state of removing the battery pack 130 from the charging apparatus is displayed.

On the other hand, the charging circuit 110 consumes electric power corresponding to the lighting of the LED for status display 140, and so the electric power supply to the charging circuit 110 never becomes zero, and the on-off control of the switching element controller 15 is carried out in a ratio appropriate to the electric power consumption of the LED for status display 140. As a result, a constant electric power is supplied to the primary side of transformer T1 and in response to it, enough electric power capable of ensuring the operation is supplied to the control circuit 120 connected to sub winding 11c of the secondary side. As a result, a control signal from the control circuit 120 is output surely to the switching element 14 and the on-off control of the switching element 14 is performed stably.

When the LED for status display 140 does not perform electric power consumption, the adjusting load resistor R1 perform electric power consumption on behalf, and the switching element is stabilized and the drive power of the control circuit is secured.

1-3. Effects of First Embodiment

With regard to the present embodiment, because the electric power for lighting the LED for status display 140 in order for displaying the standby state or the charge completion is supplied from the side of the main winding 11b, the bleeder resistor becomes unnecessary as compared to the conventional case where the electric power is supplied from the side of the sub winding 11c and the standby power can be reduced.

In addition, because a current can be supplied by connecting a bleeder resistor, in lights-out time, that is, in a time no current flows through the LED, when it is desired to blink the LED depending on the state of the battery, the switching element can be stabilized and the drive power the control circuit can be secured, while reducing the electric power consumption.

Particularly, though a bleeder resistor has been provided to the side of the charging circuit 110 connected to the main winding 11b, the bleeder resistor has no sense other than stabilization of the switching element 14. In contrast, with regard to the present embodiment, because the LED for status display 140 which is indispensable in the charging apparatus is used as a device for stabilization, there is an effect of achieving both electric power reduction and stabilization of the switching element 14, without using an extra member.

With regard to the present embodiment, because the constant voltage circuit 141 is connected to the LED for status display 140, a constant voltage is supplied to the LED for status display 140 by the constant voltage circuit 141, even if the battery voltage is changed. Therefore, emission amount, or brightness, of the light by the LED for status display 140 does not change by the load, state, and there is an advantage that the display of the lighting and the blinking is easy to watch.

Modifications of First Embodiment

The present invention includes the following modification examples, not limited to the first embodiment as illustrated.
(1) Number and type of the LED for status display 140 can be changed appropriately, in accordance with the electric energy consumption required for the stabilization of the display mode and the switching element 14.
(2) Though one main winding is provided to the transformer and a charging circuit is connected to the main winding in the illustrated first embodiment, it is possible to provide a plurality of main windings and to provide one charging circuit to each of the main winding. In that case, it is possible to provide a LED for display to every charging circuit. It is also possible to provide a LED for display to each of some charging circuits, and to turn on the LEDs when all the charging circuits become light load.

(3) Though the constant voltage circuit is connected to the LED for display in series and is connected to the main winding in the illustrated first embodiment, it does not need necessarily to provide the constant voltage circuit at the position in the drawing, if a constant voltage can be taken out from the charging circuit.

(4) In a case when it is unnecessary to blink the LED, that is, in a case when it is sufficient to turn on the LED at light-load time only, the adjusting load resistor R1 and the load adjustment circuit 143 are unnecessary.

2. Second Embodiment 2-1. Configuration of Second Embodiment (1) Primary Side Circuit Hereinafter, a second embodiment of the present invention shall be described, specifically according to FIG. 3. In the present embodiment, an AC power source 22 is connected to one end of the primary winding 21a of a transformer D22 through a rectifying circuit portion 23 and a switching element Q21 is connected to the other end of the primary winding 21a. In the switching element Q21, a primary side controller 25 for controlling the on-off is provided.

A receiving portion of the photo-coupler PHC2 is connected to the primary side controller 25, and the receiving portion receives the control signal of the switching element Q21 which is transmitted from the control circuit 220. The transmission portion of the photo PHC2 is provided on the charging circuit 210 which is connected to the secondary side of the transformer T2. Thus, the primary side controller 25 controls the on-off operation of the switching element Q21 in response to signals from the feedback element of the secondary side through the photocoupler PHC2. In the primary side controller 25, the switching element Q21 is set to an intermittent oscillation state such as a burst mode, so as to reduce the electric power consumption at the non-mounting state of the battery pack or at light-load time of such as charge completion time.

The on-off operation of the switching element Q21 is controlled at the primary side controller 25 based on the control signal from the control circuit 220, and the switching element Q21 outputs a charge output to the secondary side. Two windings of the main winding 21b and the sub winding 21c are provided on the secondary side of the transformer T2. A charging circuit 210 is connected to the main winding 21b, and control circuit 220 is connected to the sub winding 21c.

(2) Charging Circuit 210

A battery pack 230 to be charged is connected to the charging circuit 210, and the voltage required for charging the battery pack 230 is supplied from the main winding 21b. The battery pack 230 is a package in which secondary batteries connected in series and a battery pack internal circuit such as a temperature sensor and a protective element for the inside of the battery are contained.

In the charging circuit 210, a diode D21 and a capacitor C21 for rectification connected to the main winding 21b, and a charging switch 211 to start charging or to stop to charging of the battery pack 230 are provided. In the present embodiment, the switching element Q23 is composed of a switching element Q23 for turning on and off by a signal from the control circuit 220, a diode D24 for preventing back flow which is inserted into the side of the battery pack 230.

(3) Control Circuit 220

The control circuit 220 controls the voltage and the electric power of the charging circuit 210 in response to the state of the charge and discharge of the battery pack 230, and the electric power for driving the control circuit 220 is supplied from the sub winding 21c. The control circuit 220 includes a diode D25 and a capacitor 22 for rectification connected to the sub winding 21c, and a series regulator 223. The diode D25 and the capacitor 22 constitutes a rectifying unit for the control circuit 220 and rectifies the secondary side (controller side) of the transformer T2. The series regulator 223 converts the voltage of the rectifying unit for the control circuit 220 which changes in the state of load on the charging side, to a constant stable voltage.

The control circuit 220 includes a charge control unit 221 connected to the charging switch 211 of the charging circuit 210, the battery state determining circuit 222 connected to the battery pack internal circuit 231 for determining the state of the battery pack 230. The charge control unit 221 is connected to the battery state determining circuit 222, and turn on and off the charging switch 211 responding to the charge and discharge state of the battery pack 230 and the battery temperature which are detected by the battery state determining circuit 222.

The charge control unit 221 is connected to the current controller 212 provided in the charging circuit 210. The current controller 212 is a circuit portion for controlling the current flowing through the battery pack 230. A current detection resistor R25 is connected between the current controller 212 and the one end of the battery pack 230, and a Zener diode D23 is connected between the current controller 212 and the other end of the battery pack 230.

The current detection resistor R25 detects the current flowing through the battery pack 230 as a voltage across the both ends, and quantifies the amount of the current flowing through the charging circuit 210. With regard to the Zener diode D23, has a Zener voltage, a reference voltage (Zener voltage) which is larger than the maximum battery voltage is set so that a voltage above a certain level is not loaded when the charge switch 211 is turned off.

(4) Voltage Switching Circuit 240

In the present embodiment, a voltage switching circuit 240 is provided for switching the reference voltage which is fed back to the switching element Q21 on the primary side, at charging time of the battery pack 230 by the charging circuit 210, and at light-load time such as non-mounting time of the battery pack or charge completion time. The voltage switching circuit 240 has a switching element Q24 such as a transistor connected between the charging circuit 210 and the circuit control 220 through resistors R22, R23.

The switching element Q24 is intended to lower the voltage of the control circuit 220, at light-load time, that is, when the charging switch 211 is turned off. Therefore, the charge control unit 221 is connected to the base terminal of the switching element Q24, and when lowering the voltage of the control circuit 220, a signal to turn on the switching element Q24 is output from the charge control unit 221.

In the charging circuit 210, a switching element Q22 for voltage switching is provided in parallel with the Zener diode D23. A FET or a transistor can be used as the switching element Q22. A gate terminal of the switching element Q22 is connected is connected to the switching element Q24 connected to the charge control unit 221, at a connecting portion of the resistor R22 and R23. One terminal of the switching element Q22 is connected to the main winding 21b of the charging circuit 210, the other terminal ix connected to the current controller 212 through the Zener diode D22. Therefore, when the switching element Q24 connected to the charge control unit 221 is turned on, current flows in R22, R23 resistors and the switching element Q22 is turned on.

When the switching element Q24 is turned on, the Zener diode D22 conducts, and current flows through the secondary side photocoupler PHC2. Therefore, the voltage having been fed back and controlled by the primary side Zener voltage of the Zener diode D23, becomes to be controlled by the Zener voltage of the Zener diode D22. At this time, the Zener voltages of the Zener diodes D22, D23 have the following relation.

The Zener voltage of D23>The Zener voltage of D22>Minimum operating voltage of the series regulator 223

Between the rectifying diode D21 connected to the main winding 21b, and the series regulator 223 of the control circuit 220, a diode D26 which supplies a current toward the control circuit 220 from the charging circuit 210 is provided. When the voltage of the control circuit 220 is lower than the voltage of the charging circuit 210, the diode D26 supplies a current to the side of the control circuit 220.

2-2. Operation of Second Embodiment (1) At Charging Time of Battery Pack

In the present embodiment, when the battery pack 230 to be charged is connected to the charging circuit 210, the battery state determining circuit 222 determines whether it is necessary to charge responding to the state of the battery pack detected from the battery pack internal circuit 231. When it is determined that it is necessary to charge the battery pack 230, the charge control unit 221 of the control circuit 220 turns on the charging switch 211. At the same time, the charge control unit 221 turns off the switching element Q24 attached thereto and turning to the charge state, and outputs a control start command to the current controller 212 of the charging circuit 210 for outputting a control start command to the switching element Q21 on the primary side.

The current controller 212 monitors the voltage of the current detection resistor R25, and when the voltage grows larger than a predetermined voltage value, the current controller 212 supplies a current which is a signal for controlling the on-off of the switching element Q21 on the primary side, to the transmission portion of the photocoupler PHC2 through the resistor R24. Thus, the signal for controlling the current and the voltage on the secondary side being controlled using the photocoupler PHC2 is fed back to the primary side.

The primary side controller 25 performs on-off control of the switching element Q21, receiving a signal from the secondary side through the photocoupler PHC2, and accordingly supplies necessary electric power to the primary side of the transformer T2. On the secondary side of transformer T2, the main winding 21b steps down the voltage controlled by the switching element Q21, and generates a voltage required by the charging circuit 210, and rectification is performed by the diode 21 and the capacitor C21 which are rectifying elements, and then charging of the battery pack 230 is performed. In this ease, because a voltage required for charging the battery pack 230 is supplied to the secondary side of the transformer T2, seven in sub winding 21c, sufficient voltage for stably operating the series regulator 223 of the control circuit 220 is supplied.

(2) At Non-Mounting Time of Battery Pack, Charge Completion Time

When the battery state determining circuit 222 of the control circuit 220 detects charge completion of the battery pack 230, the charging control unit 221 turn off the switching element Q24 and stop charging, and the switching element Q24 is turned on. Then voltage is loaded to the gate terminal of the switching element Q22 for voltage switching from the resistors R22, R23, and the switching element Q22 is turned on.

In the Zener diodes D23, D22 connected to the current controller 212, the Zener voltage set at D22 is lower than the Zener voltage set at D23. Therefore, a current which is a signal to control on-off operation of the switching element Q21 on the primary side so that the voltage equals to the voltage set by the Zener voltage of the Zener diode D22 is supplied to the transmission portion of the photocoupler PHC2 from D22 through the resistor R24. As a result, on-off control of the switching element Q21 on the primary side is performed at a timing when a voltage lower than the voltage during charging is generated in the charging circuit 210.

The current generated at the low voltage by the charging circuit 210 flows toward the control circuit 220 from the charging circuit 210 through a diode D26, and drives the series regulator 223. In this case, because the Zener voltage of the Zener diode D22 is set higher than the minimum operating voltage of the series regulator 223, the series regulator 223 can operate stably, and each part of the control circuit 210 is also driven appropriately.

2-3. Effects of Second Embodiment

According to the present embodiment, the voltage of the charging circuit 210 can be stepped down to a minimum voltage required by the series regulator 223 by the switching circuit 240, and insufficient amount of the electric power to the electric power which is supplied to the control circuit 220 from the sub winding 21c at light load time can be compensated by the electric power of the side of the charging circuit 210 passing through the diode 26. As a result, without providing the bleeder resistor in the charging circuit 210, by appropriately selecting the Zener voltage which is set to the Zener diodes D22, D23, it is possible to realize a stable operation of the control circuit 220 at a time of light load to the charging circuit 210, power loss due to the bleed resistor is avoided, and the electric power during standby condition and after charge completion can be reduced.

Particularly, in a circuit with such a configuration, there is a parasitic diode inside the charging switch 211. When the voltage of the battery pack 230 is greater than the voltage of the charging circuit 210, a current flows to the charging circuit 210 from the battery pack 230, and allows the battery pack 230 in a charged state to discharge. In the present embodiment, because a backflow preventing diode D24 is inserted in order to prevent this, such an inconvenience can be prevented. Further, in the circuit of such a configuration, in a case the charging switch 211 is composed of a transistor Q23, when there is a voltage difference larger than a withstanding voltage between the emitter-base, between the voltage of the battery pack 230 and the voltage of the charging circuit 210, the transistor Q23 conducts, but in the present embodiment, conduction is prevented by the backflow preventing diode D24.

3. Third Embodiment 3-1. Configuration of Third Embodiment

Figure 4:
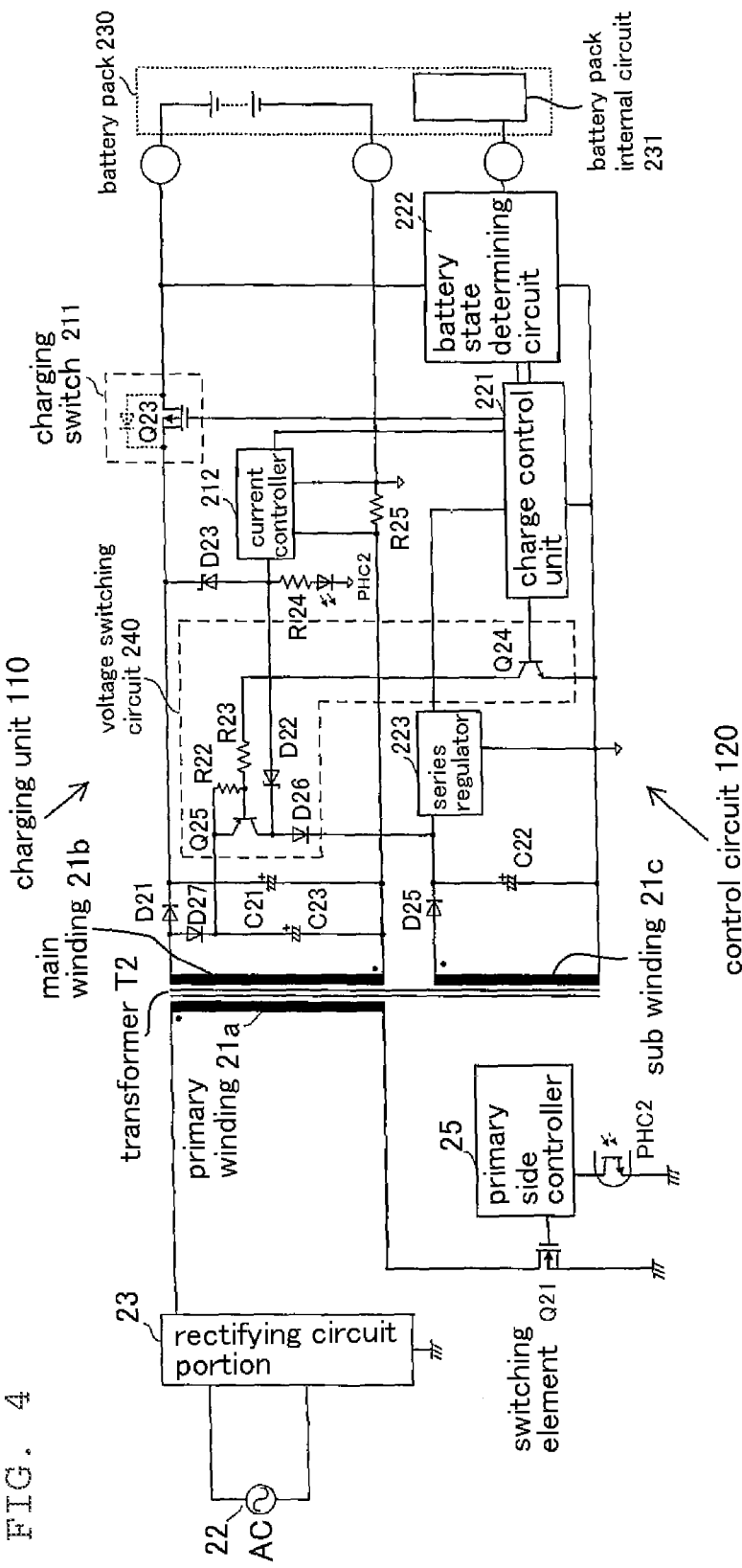
FIG. 4 is a circuit diagram showing a third embodiment according to the present invention.

The third embodiment of the present invention is described according to FIG. 4. In addition, with regard to the configurations similar to those in the second embodiment, the same reference numerals are given, and the description is omitted.

Figure 3:
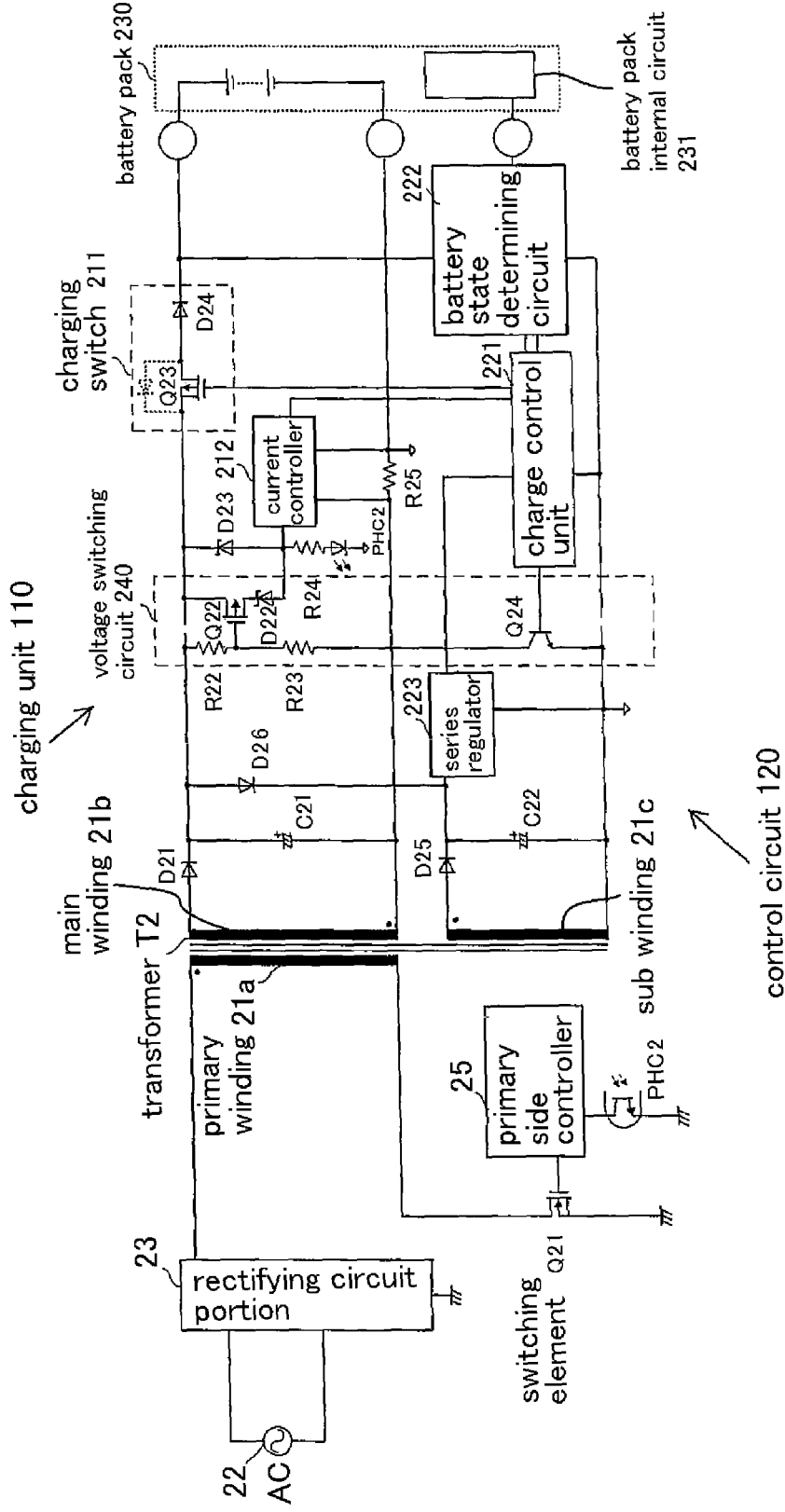
FIG. 3 is a circuit diagram showing a second embodiment according to the present invention.

In the present embodiment by providing a rectifying unit in the charging circuit 210 with the second rectifier diode D27 and the capacitor C23 in parallel with the rectifier diode D21 and the capacitor C21 as provided in FIG. 3, the two way rectifying circuits are formed in the charging circuit 210. When the battery pack 230 is not inserted, or under charging and the transistor Q24 is turned off, the second rectifying circuit composed of the diode D27 and the capacitor C23 has almost the same potential as the potential of the first rectifying circuit composed of the diode D21 and the capacitor C21.

In the voltage switching circuit 240, a switching element Q25 consisting a FET is provided, and a switching element Q24 connected to is connected to the charge control unit 221 is connected to the gate terminal. The terminal of the drain side of the switching element Q25 is connected to the switching element Q24 of the side of the charge control unit 221 through the resistors R22, R23. The terminal of the source side of the switching element Q25 is connected to the current controller 212 through the Zener diode D22. In this case, the Zener diodes D22, D23 have the following relation.

The Zener voltage of D23>The Zener voltage of D22>Minimum operating voltage of the series regulator 223

Further, the terminal on the source side of the witching element Q25, is connected to the input side of the series regulator 223 through a diode D26. When the voltage of the control circuit 220 is lower than the voltage of the charging circuit 210, the diode D26 supplies a current to the side of the control circuit 220.

3-2. Operation of Third Embodiment (1) At Charging Time of Battery Pack

In the present embodiment, because the switching element Q24 is turned off by a command from the charge control unit 221 during charging the battery pack 230, no electric current flows into the switching element Q25. Therefore, when a voltage exceeding a predetermined voltage is detected by monitoring a voltage of a current detection resistor R25, a current controller 212 supplies a current for controlling on-off operation of the switching element Q21 of the primary side, to the transmission portion of the photocoupler PHC2 through a resistor R24. Thus, a signal for controlling the current in the secondary side is fed back to the primary side, using the photocoupler PHC2.

(2) At Non-Mounting Time of Battery Pack, Charge Completion Time

When the battery state determining circuit 222 of the control circuit 220 detects charge completion of the battery pack 230, the charge control unit 221 turns off the charging switch 211 and stops charging, and the switching element Q24 is turned on. Then, the switching voltage switching element Q25 is turned on through the resistors R22, R23.

When the switching element Q25 is turned on, the Zener diode D22 conducts and a current flows through the photocoupler PHC2 of the secondary side. Therefore, the voltage which has been fed back to the primary side and controlled by the Zener voltage of the Zener diode D23, becomes to be controlled by the Zener voltage of the Zener diode D22. As a result, the switching element Q21 of the primary side becomes to be on-off controlled at a timing when a voltage lower than the voltage at charging is generated in the charging circuit 210.

Because the diode 26 supplies a current to the control circuit 220, when the switching element Q25 is turned on, and moreover, the voltage of the voltage control circuit 220 is smaller than the voltage of the charging circuit 210, the current of low voltage that is generated by the charging circuit 210 flows toward the control circuit 220 from the charging circuit 210 through the diode D26 and the switching element Q25 from the side of the second rectifying circuit, and drives the series regulator 223. In this case, because the Zener voltage of the Zener diode 22 is set higher than the minimum operating voltage of the series regulator 223, the series regulator 223 operates stably, and each part of the control circuit 220 is also driven appropriately.

3-3. Effects of Third Embodiment

In the present embodiment, the rectifying circuit portion provided in the charging circuit 210 is divided to two portions, and the charge control unit 221 outputs a signal to turn on the switching element Q24 at standby time and charge completion time and operates the voltage switching circuit 240. Then, the voltage of the charging circuit 210 is dropped down to a minimum operating voltage of the series regulator 223, and an electric power is supplied to the control circuit 220. Therefore, according to the present embodiment, because the bleeder resistor becomes unnecessary, and electric power consumption at light load time can be reduced significantly, while a minimum voltage to operate the series regulator 23 can be secured by the Zener voltage of the Zener diode D22, stable operation of the control circuit 220 also can be secured.

In the present embodiment, though the voltage of the charging circuit 210 is the voltage of the battery pack 230 when the charging of the battery pack 230 is completed and the switching element Q24 is turned on, the current from the battery pack 230 does not flow to the diode D26 due to the existence of the diode D26. In the second embodiment, there is a problem that the current from the battery pack 230 after of charge completion flows through the control circuit 220. However, in this embodiment, because the diode D21 for rectifying blocks the current from the battery pack 230, the backflow preventing diode D24 of the second embodiment becomes unnecessary, and the loss due to the back-flow preventing diode D24 during charging does not occur. In addition, by turning off the switching element Q24 during charging, the loss of this portion is also hardly generated.

In the present embodiment, because a charge current does not flow through the side of the battery pack 230 even if the switching element Q23 which configures the charging switch 211 does not exist when the relation is satisfied that the voltage of the battery after charge completion is larger than the voltage of the charging circuit 210 after it was switched after charge completion (the minimum operating voltage of the series regulator 223), the charging switch 211 can be omitted. That is, when there is no battery pack 230, the voltages of the charging circuit 210 and the battery pack 230 are about the same, and even if there exists a battery pack having a higher voltage than the voltage of the charging circuit 210, the charging current side does not flow to the side of the battery pack 230. In this case, the electric power during charging can be reduced.

Another Aspect Based on the Second and Third Embodiments

The second and third embodiments may be configured as a charging apparatus for a secondary battery according to another aspect of the present invention as follows. A charging apparatus for a secondary battery comprises: a power supply circuit connected to a primary winding of a transformer; a first switching element connected to the power supply circuit, the first switching element turning on and off a voltage applied to the transformer, and a primary-side control unit performing an on-off control thereof; a main winding and a sub winding connected to a secondary side of the transformer; a charging circuit connected to the main winding, the charging circuit supplying power to a battery pack to be charged; and a control circuit connected to the sub winding, the control circuit controlling charging to the battery pack responding to a charge state of the battery pack, wherein the charging circuit comprises a first constant voltage setting unit and a second constant voltage setting unit, each retaining a voltage of the charging circuit at a constant pre-set value, wherein the first constant voltage setting unit sets a first voltage capable of charging at any battery voltage of the battery pack, and the second constant voltage setting unit sets a second voltage lower than the first voltage and higher than a voltage necessary to drive the control circuit, wherein the control circuit comprises a battery state determining circuit detecting a charge state of the battery pack, and a charge control unit switching the first constant voltage setting unit and the second constant voltage setting unit in response to a detection result of the battery state determining circuit, wherein the charge control unit flows current required for the control circuit to the control circuit from the charging circuit based on the second voltage set by the second constant voltage setting unit at non-mounting time or charge completion time of the battery pack.

In the second aspect, the charging apparatus for the secondary battery may further comprise a second switching element connected to the charge control unit, the second switching element being turned on at non-mounting time or charge completion time of the battery pack, wherein the first constant voltage setting unit may switch to the second constant voltage setting unit by turning on the second switching element.

In the second aspect, the first constant voltage setting unit and the second constant voltage setting unit may be connected in parallel with regard to the charging circuit, the second switching element may be connected to the second constant voltage setting unit, and the second constant voltage setting unit may be loaded by turning on the second switching element.

In the second aspect, the charging circuit may comprise a rectifying unit for charging time and a rectifying unit for light-load time, the first constant voltage setting unit may be connected to the rectifying unit for charging time, the second constant voltage setting unit may be connected to the rectifying unit for light-load time, the second switching element may be connected to the second constant voltage setting unit, and the second constant voltage setting unit may be loaded by turning on the second switching element.

In the second aspect, the charging circuit and the control circuit may be connected via a diode provided between the rectifying unit provided in the charging circuit and the control circuit.

In the second aspect, the charging circuit and the control circuit may be connected via a diode provided between the rectifying unit for light-load time and the control circuit.

In the second aspect, each of the first constant voltage setting unit and the second constant voltage setting unit comprises a Zeller diode.

Modifications of Second and Third Embodiments

The present invention is not limited to second embodiment and the third embodiment illustrated, and includes the following modification examples (1) Though the Zener diodes D22, D23 are employed as a constant voltage setting unit for a charging time and for a light load time which is provided in the voltage switching circuit 240, in the second embodiment and the third embodiment illustrated as illustrated, on behalf of the Zeller diode, another member or another circuit as the constant voltage setting unit can be employed.

(2) In light-load time, in order to supply an electric power to the side of the control circuit 220 from the charging circuit 210, using a member other than the diode D26 which is connected at the position as illustrated, a current after rectification can be supplied to a portion preceding the series regulator 223 from elsewhere. For example, by employing the switching element Q25 as employed in the third embodiment, it is possible to supply an electric power directly though the diode D26 from the rectifying circuit of the charging side as shown in the second embodiment.

(3) As means for transmitting an information of the charging circuit of the secondary side to the primary side controller 210, it is possible to use the signal transmission means using another electrical circuit, not limited to the photocoupler PHC2.

REFERENCE SIGNS LIST

First Embodiment

T1 . . . transformer; D11, D12 . . . diode; C11, C12 . . . capacitor; R1 . . . load adjusting resistor; 11a . . . primary winding; 11b . . . main winding; 11c . . . sub winding; 12 . . . AC power supply; 13 . . . rectifying circuit portion; 14 . . . switching element; 15 . . . switching element controller; 16 . . . or; 110 . . . charging circuit; 111 . . . charging switch; 120 . . . control circuit; 121 . . . charge control unit; 122 . . . battery state determining circuit; 123 . . . control signal output portion; 130 . . . battery pack; 140 . . . LED for status display; 141 . . . constant voltage circuit; 142 . . . LED lighting circuit; 143 . . . load adjusting circuit.

Second and Third Embodiments

T2 . . . transformer; D21, D25, D27 . . . diode; C21, C22, C23 . . . capacitor; D22, D23 . . . Zener diode; D24 . . . backflow preventing diode; D26 . . . diode; R22-R25 . . . resistor; Q21-Q25 . . . switching element; PHC2 . . . photocoupler; 21a . . . primary winding; 21b . . . main winding; 21c . . . sub winding; 22 . . . AC power supply; 23, . . . rectifying circuit portion; 24 . . . switching element; 25 . . . primary side controller; 210 . . . charging circuit; 211 . . . charging switch; 212 . . . current controller; 220 . . . control circuit; 221 . . . charge control unit; 222 . . . battery state determining circuit; 223, . . . series regulator; 230 . . . battery pack; 231 . . . battery pack internal circuit; 240 . . . voltage switching circuit.

The invention claimed is:
1. A charging apparatus for a secondary battery, comprising:
a power supply circuit connected to a primary winding of a transformer;
a main winding and a sub winding connected to a secondary side of the transformer;
a charging circuit connected to the main winding, the charging circuit supplying power to a battery pack to be charged; and
a control circuit connected to the sub winding, the control circuit controlling the charging circuit,
wherein the charging circuit comprises a LED indicating a standby state or a charge completion state, the LED being lighted at a light-load time of the charging circuit based on a command of the control circuit, wherein the LED is connected to the charging circuit via a constant voltage circuit connected in series with the LED, and wherein the charging circuit comprises a resistor connected to a connection point of the LED and the constant voltage circuit at one end and connected to the control circuit at the other end.

2. The charging apparatus for the secondary battery according to claim 1, wherein the control circuit allows the LED to blink responding to a charge state of the battery pack at light-load time of the charging circuit, controls current not to flow to the resistor when the LED is lighted, and controls current to flow to the resistor when the LED is not lighted.

3. A charging apparatus for a secondary battery, comprising:
   a power supply circuit connected to a primary winding of a transformer;
   a main winding and a sub winding connected to a secondary side of the transformer;
   a charging circuit connected to the main winding, the charging circuit supplying power to a battery pack to be charged; and
   a control circuit connected to the sub winding, the control circuit controlling the charging circuit,
   wherein the charging circuit comprises a LED indicating a standby state or a charge completion state, the LED being lighted at a light-load time of the charging circuit based on a command of the control circuit,
   wherein the LED is, at one end, connected to one end of a resistor, and is, at the other end, connected to the other end of the resistor, and
   wherein the control circuit allows the LED to blink responding to a charge state of the battery pack, controls current not to flow to the resistor when the LED is lighted, and controls current to flow to the resistor when the LED is not lighted.

\* \* \* \* \*